US011167250B1

(12) United States Patent
Hibbs et al.

(10) Patent No.: US 11,167,250 B1
(45) Date of Patent: Nov. 9, 2021

(54) FILTRATION MEMBRANES

(71) Applicant: National Technology & Engineering Solutions of Sandia, LLC, Albuquerque, NM (US)

(72) Inventors: Michael Hibbs, Albuquerque, NM (US); Laura Biedermann, Albuquerque, NM (US); Kevin R. Zavadil, Bernalillo, NM (US); David R. Wheeler, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 110 days.

(21) Appl. No.: 16/576,426

(22) Filed: Sep. 19, 2019

(51) Int. Cl.
*B01D 71/02* (2006.01)
*C01B 32/10* (2017.01)
*B01D 69/10* (2006.01)
*B01D 69/12* (2006.01)
*B01D 67/00* (2006.01)
*C01B 32/198* (2017.01)

(52) U.S. Cl.
CPC ....... *B01D 71/024* (2013.01); *B01D 67/0076* (2013.01); *B01D 67/0088* (2013.01); *B01D 67/0093* (2013.01); *B01D 69/10* (2013.01); *B01D 69/12* (2013.01); *B01D 71/021* (2013.01); *C01B 32/198* (2017.08)

(58) Field of Classification Search
CPC ............... B01D 71/021; B01D 71/024; B01D 67/0076; B01D 67/0088; B01D 69/10; B01D 69/12; C01B 32/198
See application file for complete search history.

(56) References Cited

U.S. PATENT DOCUMENTS

| 7,108,917 B2 | 9/2006 | Klug | |
|---|---|---|---|
| 7,241,409 B2 | 7/2007 | Calarco et al. | |
| 8,147,599 B2 | 4/2012 | McAlister | |
| 2014/0311967 A1* | 10/2014 | Grossman | B32B 3/00 210/500.21 |
| 2015/0346199 A1* | 12/2015 | Li | G01N 33/56911 506/9 |
| 2016/0354729 A1* | 12/2016 | Krishna | B01D 67/0097 |
| 2017/0106342 A1* | 4/2017 | Raveendran-Nair | C01B 32/182 |
| 2017/0174537 A1* | 6/2017 | Zheng | B01D 71/024 |
| 2019/0015792 A1* | 1/2019 | Lin | B01D 71/024 |
| 2019/0224628 A1* | 7/2019 | Lin | B01D 71/02 |
| 2019/0270053 A1* | 9/2019 | Abdelkader | B01D 67/0006 |
| 2019/0314770 A1* | 10/2019 | Wang | C02F 1/441 |

OTHER PUBLICATIONS

Y. Han, et al., "Ultrathin Graphene Nanofiltration Membrane for Water Purification", Advanced Functional Materials, 2013, 23, pp. 3693-3700.

(Continued)

*Primary Examiner* — John Kim
(74) *Attorney, Agent, or Firm* — Daniel J. Jenkins

(57) ABSTRACT

A membrane assembly is provided. The membrane assembly includes a non-metallic, porous substrate. A graphene oxide membrane is formed over the non-metallic, porous substrate. A chemical linker interface covalently binds the graphene oxide membrane to the non-metallic, porous substrate.

15 Claims, 4 Drawing Sheets

(56) References Cited

OTHER PUBLICATIONS

M. Hu and B. Mi, "Enabling Graphene Oxide Nanosheets as Water Separation Membranes", Environmental Science & Technology, 2013, 47, pp. 3715-3723.
R.R. Nair, et al., "Unimpeded Permeation of Water Through Helium-Leak-Tight Graphene-Based Membranes", Science 335, 2012, pp. 442-444.
C. Xu, et al., "Graphene Oxice-TiO2 Composite Filtration Membranes and Their Potential Application for Water Purification", Carbon, 2013, 62, pp. 465-471.
A. Ambrosi, et al., "Large-Scale Quantification of CVD Graphene Surface Coverage", Nanoscale, 2013, pp. 2379-2387.
K. Putz, et al., "Evolution of Order During Vacuum-Assisted Self-Assembly of Graphene Oxide Paper and Associated Polymer Nanocomposites", ACS NANO, 2011, 5, pp. 6601-6609.
G.J. Stiegel, et al., "Power Plant Water Usage and Loss Study", The United States Department of Energy National Energy Technology Laboratory, Aug. 2005, 104 pages.
D. Boukhvalov, et al. "Origin of Anomalous Water Permeation Through Graphene Oxide Membrane," Nano Lett 2013, 13, 3930-3935.

\* cited by examiner

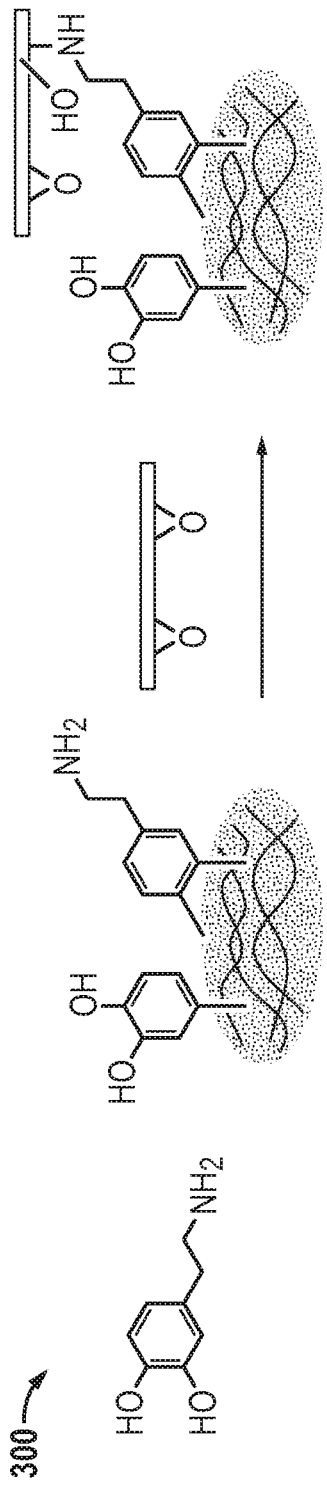
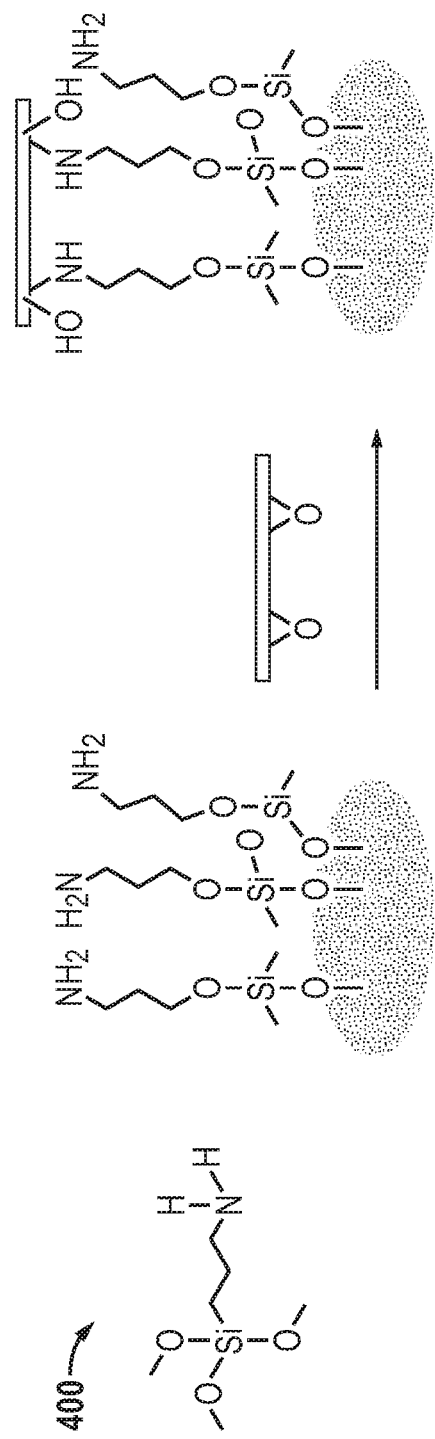
FIG. 3
FIG. 4

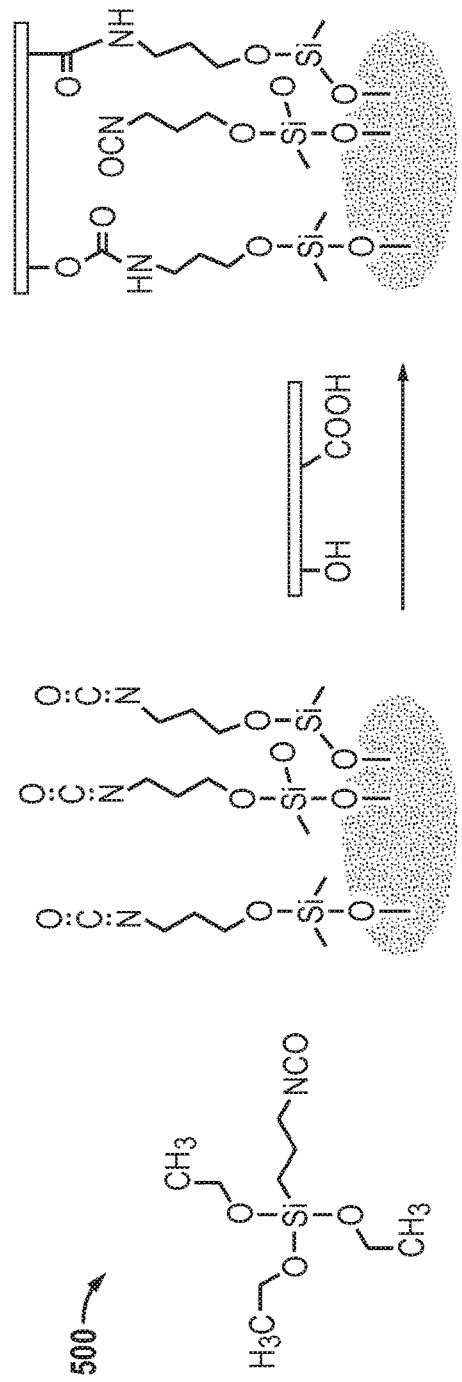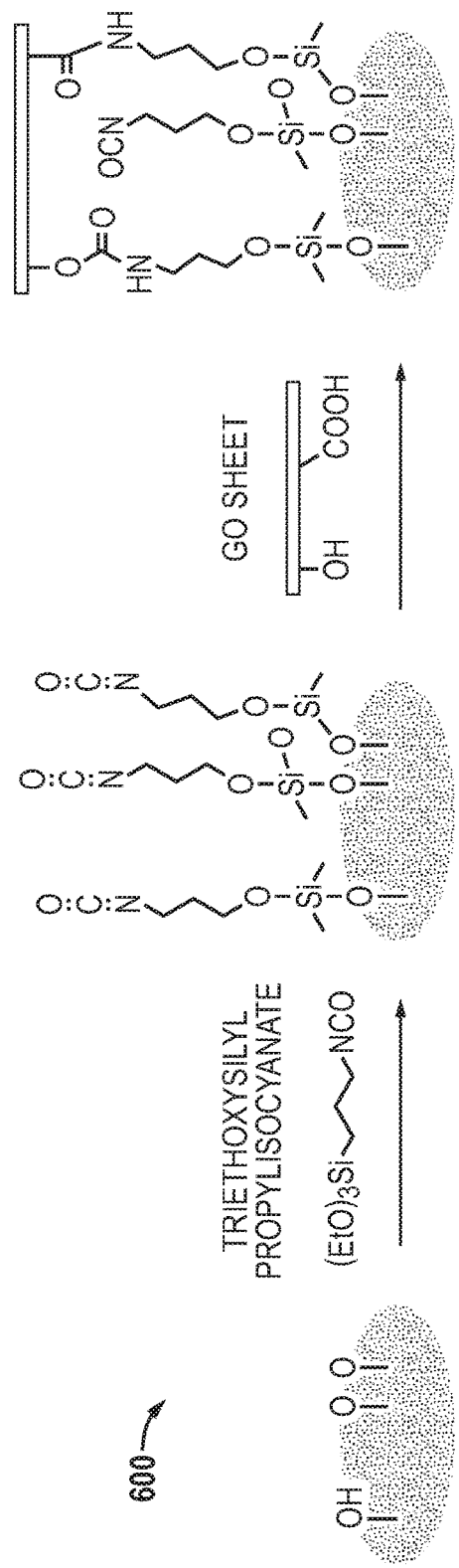

FILTRATION MEMBRANES

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The present invention is generally directed to filtration and more particularly to filtration membrane assemblies and systems employing the same.

Seventy percent of the world is covered with water and of that, approximately ninety eight percent is saline or brackish. Of the remaining two percent that is fresh water, a significant amount of that water is currently locked in glaciers. The relative scarcity of fresh water threatens energy security and exacerbates geopolitical conflict. As a result, efforts have been undertaken to enable the production of fresh water from the abundance of brackish and saline water supplies. Additionally, greywater recycling and recycling of water used in industrial processes will help conserve the limited freshwater supply.

Desalination membranes enable the recycling of scarce water resources and the productive use of abundant saline water supplies. Demand for desalination capabilities comes from industries as varied as energy, agriculture, and public utilities. The vast array of water sources and differing requirements for purified water indicate that a variety of technologies will be needed to meet the demands.

Unfortunately, methods of water production are limited by existing membrane technologies that require a high energy input, are degraded by exposure to chlorine or other strong oxidants, or they are easily impaired by biofouling. Current technologies include thermal distillation, membrane distillation, forward osmosis, nanofiltration, and reverse osmosis.

In reverse osmosis (RO), a high-pressure gradient (e.g., 40-80 bar for sea water) drives liquid water through a solid polymer membrane in which diffusion through the polymer separates dissolved ions from water. RO is an energy intensive process because the driving pressure (applied water pressure) must be greater than the osmotic pressure. For this reason, RO is ineffective at desalinating water with high total dissolved solids (TDS). In nanofiltration, a high-pressure gradient again drives liquid water through a solid polymer membrane. Nanofiltration membranes may have a "looser" solid polymer salt layer that permits permeation of both water and monovalent ions.

Furthermore, RO processes typically use commercially available polyamide membranes. These membranes cannot withstand chlorine concentrations that occur at levels that are most effective at preventing bacteria growth in municipal water supplies. Consequently, the chlorine must be removed (typically <0.1 mg/L) before polyamide RO membranes can be used for greywater reuse. Also, preventing biofouling is difficult because sodium hypochlorite (bleach) cannot be used to clean the membranes.

Chemical and reduced run time costs can be incurred to ameliorate the resulting biofouling, which adds significantly to operating costs. Municipal drinking water is chlorinated to ~1 mg/L free chlorine. About 100 mg/L chlorine is used for shock treatment of drinking water wells following contamination events such as floods. As a result, low-fouling, chlorine-tolerant desalination membranes would be useful in treating diverse water supplies.

Many water treatment processes use thin-film composite membranes. Over thirty years of development have optimized the performance of the thin-film composite membranes. Thin-film composite membranes are semipermeable membranes manufactured principally for use in water purification or water desalination systems. They also have use in chemical applications such as batteries and fuel cells. Thin-film composite membranes are commonly classified as nanofiltration and reverse osmosis membranes.

Reverse osmosis and nanofiltration thin-film composite membranes comprise polyamide salt rejection layers on top of microporous and mesoporous support layers. These membranes effectively reject salt ions, but such membranes are prone to biofouling and intolerant to chlorine bleach used in water treatment. Chlorine-tolerant membranes are required for grey-water reuse and are highly beneficial for industrial water reuse and seawater desalination.

What is needed is a system and/or method that can produce chlorine-tolerant membranes or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a membrane assembly including a non-metallic, porous substrate. A graphene oxide membrane is formed over the non-metallic, porous substrate. A chemical linker interface covalently binds the graphene oxide membrane to the non-metallic, porous substrate.

Another embodiment relates to a method for assembling a membrane structure. A layer of material having a chemical linker binds to a non-metallic, porous substrate. Graphene oxide is deposited on the layer of material to form a graphene oxide membrane. The layer of material is bonded to the non-metallic, porous substrate and the graphene oxide membrane to form an interface.

Yet another embodiment relates to an article that includes a porous support. A graphene oxide membrane overlies the porous support. A binding layer is positioned therebetween. The binding layer abuts the porous support and the graphene oxide membrane and includes a plurality of chemical linker components therein with at least one of the chemical linker components bonding the porous support to the graphene oxide membrane.

Alternative exemplary embodiments relate to other features and combinations of features as can be generally recited in the claims.

BRIEF DESCRIPTION OF THE DRAWINGS

The application will become more fully understood from the following detailed description, taken in conjunction with the accompanying figures, wherein like reference numerals refer to like elements, in which:

FIG. 3 illustrates a covalent binding reaction for a dopamine-based adhesion promoter.

FIG. 4 illustrates a covalent binding reaction for a trimethoxysilane-based adhesion promoter.

FIG. 5 illustrates a covalent binding reaction for an isocyanate-based adhesion promoter.

FIG. 6 illustrates a chemical reaction for an attachment scheme to bond graphene oxide to a substrate.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting. Unless otherwise indicated percentages are expressed by weight.

Exemplary embodiments of the invention relate to the use of graphene oxide (GO) in multi-layer membrane assemblies. These membrane assemblies are useful for, among other things, filtration for water production from wastewater, brackish water, and seawater. Wastewater sources include greywater, post-industrial process water, production water from oil and gas drilling operations, mining water, or any other source having a salt or other dissolved solid content above that generally considered acceptable for re-use. The membrane assemblies can be used as low-fouling, chlorine-tolerant desalination membranes for treating diverse water supplies.

One such technology uses layered graphene oxide (GO) to remove dissolved salts and other contaminants by a size exclusion mechanism. Relative to conventional polymeric composite nanofiltration membranes, GO membranes and membrane assemblies are chemically and thermally stable. Without wishing to be bound by theory, it is believed that water flux through the membranes is around the overlapping laminar GO nanosheets in a manner similar to Hagen-Poiseuille flow. This is different from water flux through conventional polymeric thin film composite membranes in which the water flows through the polyamide following a Fickian diffusion mechanism. Additionally, GO nanosheets within the membranes and membrane assemblies provide chlorine tolerance and have biocidal properties. These inherent advantages allow for membrane exposure to chlorine at levels commonly used to prevent biofouling as well as the immediate desalination of heated water from sources such as cooling towers, power plants, and oil and natural gas extraction processes.

The GO membranes and membrane assemblies reject scale-forming divalent ions when recycling cooling tower blowdown water, thereby decreasing freshwater demands of thermoelectric power plants. Target pesticide and chemical warfare simulants are rejected with 94-98% efficiency. As a result, GO membranes and membrane assemblies have the chemical tolerance and robustness to function as nanofiltration members for water reuse. Water reuse technologies can be used to support forward deployed warfighters worldwide.

Figure 1:
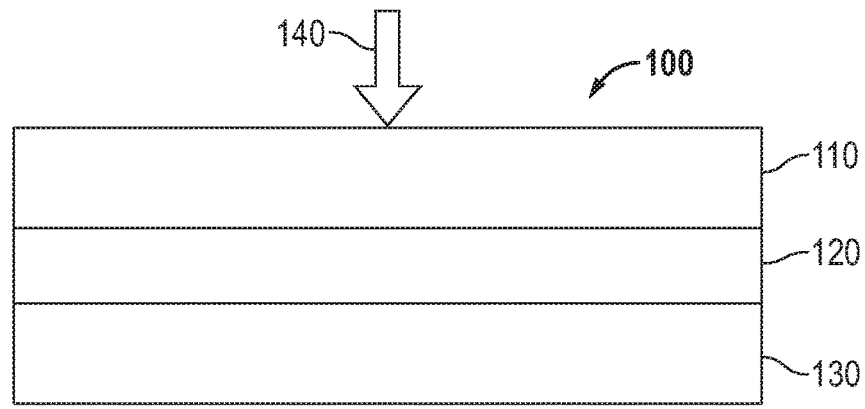
FIG. 1 schematically depicts a filter membrane assembly in accordance with an exemplary embodiment.

Turning to FIG. 1, a membrane assembly 100 in accordance with an exemplary embodiment of the invention has a GO membrane 110, an interface 120, and a porous support or substrate 130. The interface 120 is positioned between the GO membrane 110 and the substrate 130, so that the GO membrane 110 is in a spaced-apart overlying relation with the substrate 130. Water can flow through the membrane assembly 100 in the direction of stream 140.

The interface 120 binds the GO membrane 110 to the substrate 130 through a covalent bonding chemical linker attachment mechanism that can include an adhesion promoter and a flux promoter. The adhesion promoter forms covalent bonds with both the GO membrane 110 and the substrate 130. The adhesion promoter can function as a primer and, in some embodiments, can be a silane-based material that includes a molecule with two functional groups. The first functional group can be a trialkoxysilane, which can react with the substrate 130, and the second functional group can be an isocyanate or an amine, which can react with the GO membrane 110.

The flux promoter can be a bulky flux promoter that includes a hydrophilic region. The flux promoter can be a trialkoxy silane with a hydrophilic substituent that maintains the spacing between the bottom of the GO membrane 110 and the substrate 130 to maintain the ability of water to flow therethrough. The combination of the adhesion promoter and the flux promoter provides an unexpected improvement in the adhesion of the GO membrane 110, which is unexpected because the flux promoter does not form a covalent bond with GO.

The GO membrane 110 can include laminar GO covalently bound to the substrate 130. The GO membrane 110 may also include laminar GO sheets covalently bonded to each other within the laminar GO matrix. Such intra-GO covalent bonds could controllably swell the interlayer GO spacing to create a loose NF or ultrafiltration membrane.

Assembling nanosheets into a robust, functional membrane that is large enough for crossflow desalination testing presents several challenges that can be overcome through surface treatment of the substrate 130. The interface 120 can be optimized to promote adhesion of the GO membrane 110 to the substrate 130. The membrane assembly 100 is fabricated using green, scalable chemistries with a process amenable to integration into spiral-wound membrane elements. Additionally, the process to assemble the membrane assembly 100 utilizes techniques that are compatible with current membrane manufacturing methods.

Increasing the stiffness and uniformity of the substrate 130 provides mechanical durability, promotes the formation of thinner laminar GO layers within the GO membrane 110. These thinner laminar GO layers provide 2×-10× increased clean water permeation. The membrane assembly 100 has a laminar GO membrane 110 that forms a layer having a thickness of about 50 nm to 200 nm to provide the highest contaminant rejection rates.

The substrate 130 can have a pore size of between 20 nm and 1 millimeter (mm). In an embodiment, the pore size can be between 2 nm and 0.5 microns. In an embodiment, the pores can be microporous, having a pore size of between about 20 nm and 200 nm. In another embodiment, the pores can be macroporous, having a pore size greater between about 0.2 microns and 10 microns.

The substrate 130 can minimize lateral strain that could fracture the GO layers. A siloxane-based adhesion promoter within the interface 120 can link the first GO layer within the GO membrane 110 to the substrate 130 with covalent bonds. The covalent bonds prevent GO delamination at high operating pressures (up to 650 psi has been demonstrated, though 650 psi should not be construed as an upper pressure limit). As a result, the membrane assembly 100 can demonstrate excellent durability, filtering high volumes (10s of liters of test solutions) under flow conditions that are present in spiral-wound membrane operation.

The membrane assembly 100 utilizes overlapping GO sheets within the GO membrane 110 to create a dense network of nanometer-tall channels that permit water flow while blocking salt ion passage. The membrane assembly 100 can be utilized in the filtration of diverse wastewaters, including cooling tower water from natural gas fired power plants. The membrane assembly 100 can have sulfate rejections (>97%) and ibuprofen rejections (>98%) comparable to conventional nanofiltration membranes. The membrane assembly 100 can maintain GO membrane assembly integrity for months at a time.

The support or substrate 130 can include one or more materials that can form membranes. The choice of the support material that is used in the substrate 130 is determined by application environment and chemical tolerance to any processes used to covalently bond to the GO membrane 110. In some embodiments, the substrate 130 is formed from a suitable non-metallic material. Suitable non-metallic materials include polymers, plastics, ceramics, and/or composites. Exemplary non-metallic materials include polyesters, polyethylene terephthalates, polyethersulfones (PES), polysulfones, multilayer composite membranes having one or more polyethersulfones, polysulfones, cellulose acetates, polycarbonates, glass fibers, polyether ether ketones, polyethylenes, polypropylenes, and olefins. Exemplary multilayer composite membranes include ultrafiltration membranes, such as membranes that include a polyethersulfone microporous layer on a mesoporous support. The mesoporous support can be a woven or non-woven fabric support of materials such as, but not limited to, polyester or polypropylene.

In some embodiments, the substrate 130 can be formed of commercial PES or polyester polymeric membranes with porosity ~0.2 μm as the support structure for the layered graphene oxide assembly. The PES membranes can have a smoothly undulating surface with numerous pores smaller than the 0.2 μm maximum porosity. The PES can have a high maximum operating temperature (225° C.) and can be resistant to many acids, bases, and solvents. The polyester membranes have a smooth glassy surface and can be resistant to many acids, bases, and solvents. In another embodiment, the substrate 130 can have the asymmetric bilayer structure of an ultrafiltration membrane with a microporous polymer support (porosity ~0.05 microns to ~0.5 microns) integrated with a robust mesoporous support.

Figure 2:
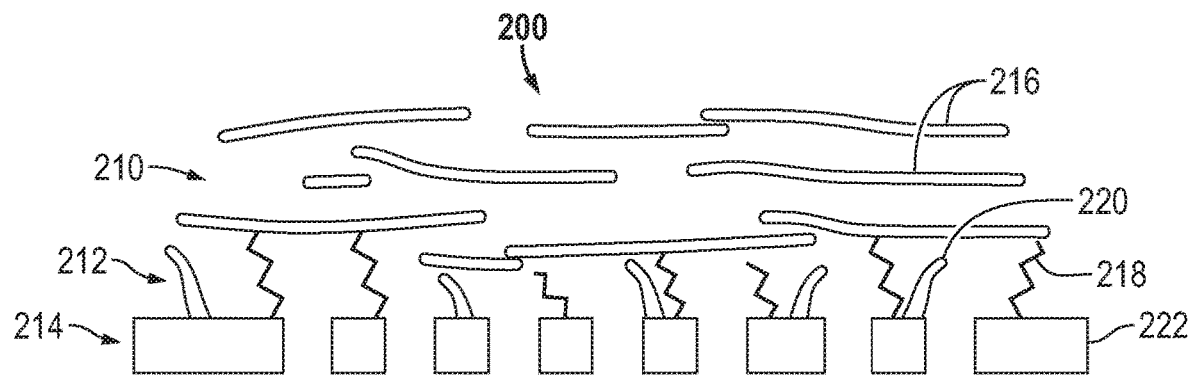
FIG. 2 schematically depicts a portion of a membrane assembly in accordance with another exemplary embodiment.

Referring now to FIG. 2 with continuous reference to the foregoing figure, an embodiment of structure, generally designated by the numeral 200, that functions as a membrane assembly is illustrated. The structure 200 includes a layered GO membrane 210, a chemical linker interface 212, and a support layer 214. The layered GO membrane 210 includes a plurality of layered GO flakes 216. The chemical linker interface 212 includes an adhesion promoter 218 and a flux promoter 220. The support layer 214 includes a plurality of supports or substrates 222. In some embodiments, the support layer 214 can include multilayer composite membranes. Alternatively, a feed spacer layer (not shown) can support the substrate 130 shown in FIG. 1 and/or the support layer 214 in a spiral-wound element (not shown).

The chemical linker interface 212 binds the layered GO membrane 210 to the support layer 214 through a covalent bonding mechanism or scheme that forms the membrane assembly 100 shown in FIG. 1. The adhesion promoter 218 can be any suitable adhesion promoter that bonds the support layer 214 to the layered GO membrane 210. Suitable adhesion promoters include dopamines, isocyanates, trimethoxysilanes, triethoxysilanes, and aminosilanes. The flux promoter 220 maintains separation between the GO membrane 210 and the support layer 214 to enhance the flow of water through the structure 200.

As can be seen in FIG. 2, the GO flakes 216 are "coarsely" arranged in layers; this layering is due to the intrinsic high stiffness of the GO flakes and the fabrication methods used, which promote planar self-assembly of the flakes. As such, the term "layer" is used herein to describe a group of flakes that are proximately disposed in the same layer plane.

The GO membrane 210 is constructed of two or more sheets/layers of graphene oxide. When two or more layers are used, the layers are coarsely parallel and overlay one another. In an embodiment, the GO membrane 210 is formed of 2 to 1,000 layers. In another embodiment, the GO membrane 210 is formed of about 10 to 500 layers. In another embodiment, the GO membrane 210 is formed of about 50 to 200 layers. Increasing the number of GO layers creates a longer permeation path, improving the filtration ability of the structure 200 for the thinnest GO membranes and increasing the probability that the underlying substrate 222 is fully covered. However, permeance declines inversely with path length, which is proportional to GO thickness. The ideal number of GO layers will depend on multiple factors, including, but not limited to, the concentration of the feed water, filtration conditions (i.e., liquid or vapor phase filtration), and the desired balance between maximizing flux and ion rejection.

The GO flakes 216 range in size between about 100 nm and 200 microns (average planar diameter). In an embodiment, the GO flakes 216 can be between about 1 micron and 20 microns in diameter. The basal plane of a GO flake is composed of graphitic and functionalized regions.

Oxygen functional groups (e.g., epoxides and hydroxyls) on the basal plane of the GO flakes 216 keep the interlayer spacing fixed in the range of about 0.7-1.1 nanometers (nm) for dehydrated GO membranes. The slit width or layer spacing is the distance between two GO flakes. These oxygen functional groups, which act as nanopillars, define a thin slit geometry on a molecular level. Without wishing to be bound by theory, it is believed this geometry allows water molecules to percolate through as monolayers or bilayers of water molecules. In this nanoconfined geometry, the water can be flowing as a solid ice layer, rather than a liquid. The narrow region through which the water flows between and around the GO flakes is the permeation pathway. In any event, graphene oxide membranes so constructed offer high flux and high permselectivity.

The layers of GO flakes 216 within the GO membrane 210 are separated by a layer spacing or a slit width. In an embodiment, the layer spacing is between 0.7 nm and 1.1 nm. The slit width is dependent on the environment of the GO membrane 210 and the operating conditions (including driving pressure, water temperature, and salinity) that the structure 200 is operating in. In a fully dehydrated condition, the layer spacing decreases to 0.7 nm. In a fully hydrated condition, in which a bilayer of water molecules exists between the GO layers, the layer spacing may increase up to 2 nm at ambient pressure conditions. The ~10-80 bar operating pressure present during filtration will decrease the interlayer spacing towards the dehydrated minimum slit width.

Permeation pathways exist within the slit width. The widest portion of the permeation pathways is between two graphitic (i.e., unfunctionalized) regions of two parallel GO flakes within the GO membrane 210. The height of the permeation pathway in such a graphitic region is approximately the layer spacing minus the thickness of an individual graphene flake (0.335 nm). This permeation pathway height is sufficient to allow one to two monolayers of water to flow between the GO flakes 216. The width of the permeation pathway is thus less than the slit width as the height (molecular thickness) of the graphene oxide flake must be taken into account. The widest permeation pathway between two parallel flakes is at locations that are unfunctionalized and between about 0.4 nm to 0.8 nm, and the width is further restricted to less than that width in areas where the flakes are functionalized. The width of the permeation pathway is the barrier limiting the permeation of solvated ions.

It is energetically unfavorable for a hydrated ion to lose its hydration sphere and then permeate through the membrane. Thus, the structure 200 effectively permits the permeation of water while blocking the permeation of most impurities (solvated ions) of concern.

Referring again to FIG. 2, the graphene oxide layers are coarsely parallel with a high degree of overlap. A given layer is composed of primarily planar GO flakes that can overlap or abut one another or be separated by a gap. When the gap width and GO flake diameters are of comparable lengths (same order of magnitude), a GO flake from the adjacent upper layer can flex to partially fill this gap. The overlap between overlapping GO flakes can range from 0% to 100%, where 100% is for a smaller GO sheet directly parallel to a larger GO sheet. The minimum energy path for water permeation will be through the path with the shortest overlaps. Throughout the GO membrane 210, the dominant interlayer spacing or slit width between the GO sheets is 0.7 nm to 1.1 nm. The high aspect ratio of GO (diameter/thickness) ensures that this will be a highly tortuous path.

Flux is dependent on the physical properties of the membrane and external driving forces. Decreasing the membrane thickness and increasing the layer spacing increases the flux, though the tradeoffs are decreasing membrane robustness and ion rejection. External driving forces for the water flux include the pressure drop across the membrane and the osmotic pressure differential across the membrane. According to an exemplary embodiment of the invention, permeance through the GO membrane assembly 210 is 3 $L/m^2/hr/bar$ or greater for liquid water passing through it. Recall, permeance is the flux normalized by the driving pressure.

The GO membrane 210 has an overall thickness in the range of about 2 nm to 1000 nm, typically in the range of about 10 nm to 500 nm although other thicknesses can also be employed. As each GO flake 216 is about 1 nm thick, this broad overall range corresponds to a GO membrane 210 composed of between 2 and 1,000 GO layers. A thinner GO membrane 210 can offer the greatest flux while a thicker GO membrane 210 can ensure all pores in the support layer 214 are covered by overlapping GO sheets. Additionally, thinner GO membranes 210 may be less susceptible to strain-induced fracture.

As shown in FIG. 2, the GO flakes 216 are arranged in a lamellar structure and are aligned into thin coarsely parallel layers to form the structure 200 that has both a high porosity and a high tortuosity. In one embodiment, the structure 200 has a density of about $10^6$-$10^{10}$ parallel channels per $cm^2$ and a permeation path length of about 100 to 100,000 times its thickness. The structure 200 is also flexible and can operate at temperatures up to 40° C. or higher without cracking.

As discussed above, the chemical linker interface 212 binds the layered GO membrane 210 to the support layer 214 using the adhesion promoter 218 and a flux promoter 220. The adhesion promoter 218 forms covalent bonds with both the layered GO membrane 210 and the support layer 214. In some embodiments, the adhesion promoter 218 bonds the support layer 214 with the GO membrane 210 that is adjacent to the chemical linker interface 212. In other embodiments, the flux promoter 220 only bonds to the support layer 214.

As discussed above, the GO flakes 216 used to form the GO membrane 210 within the structure 200 typically range from 0.1 to 200 microns across and consist of a hexagonal arrangement of carbon atoms, analogous to the basal plane of graphene, decorated in patches and along the perimeter with oxygen functional groups, generally epoxide and hydroxyl functional groups. These basal plane epoxide and hydroxyl functional groups act as nanopillars, keeping the interlayer spacing fixed in the range of about 0.7 to about 1.1 nm. Thus, in the GO membrane 210, water permeates through a tortuous path between a plurality of stacked graphene oxide monolayer flakes.

Referring again to FIG. 2, water permeation through the structure 200 is between stacked graphene oxide monolayer sheets or layers within the GO membrane 210 (parallel to the basal plane) and around the edges of overlapping flakes. Excepting for the possibility of permeation through any low-density pore defects in the GO flakes 216, water does not permeate through the basal plane of the GO flakes 216. This three-dimensional, highly tortuous pathway allows for multiple parallel permeation pathways in the case that fouling blocks some of the pores. Water has a long slip length (low friction flow) along hydrophobic graphitic (unfunctionalized) areas of the GO membrane 210, resulting in rapid permeation. According to an embodiment, the ratio of the length of the permeation pathway to the thickness of the GO membrane 210 is proportional to the average graphene oxide sheet diameter and can be $10^2:1$-$10^5:1$.

The structure 200 or any of its constituents can have a functionalized surface. In one embodiment, the surface of the structure 200 is functionalized with silver nanoparticles. Silver nanoparticles provide an anti-fungal/anti-bacterial effect that has the tendency to reduce biofouling of the filtration membrane. Other functionalization techniques, such as those currently used for functionalization of known membranes can also be employed. For example, high permeability hydrophilic surface coatings or treatments such as hydrogel layer or grafting of super-hydrophilic nanoparticles could increase the hydrophilicity of the membrane surfaces to minimize biofouling.

Referring now to FIG. 3 with continuous reference to the foregoing figures, a covalent bonding reaction, generally designated with the numeral 300, for an adhesion promoter is shown. In this exemplary embodiment, the covalent bonding reaction 300 can bind the GO membrane 110 to the substrate 130 with the interface 120 therebetween, as shown in FIG. 1, and/or the layered GO membrane 210 to the support layer 214 with the chemical linker interface 212 therebetween, as shown in FIG. 2.

The adhesion promoter can be dopamine. Dopamine includes an active functional group that adheres to surfaces and forms robust covalent bonds in an aqueous environment. In this exemplary embodiment, dopamine forms a polydopamine coating that includes primary amines that can bond to an epoxide group on GO within a GO membrane, such as the GO membrane 110 shown in FIG. 1 and/or the GO membrane 210 shown in FIG. 2. Polydopamine coatings can be prepared by soaking untreated membranes in a 0.2% aqueous solution of dopamine at a pH of 8.5 for 24 hours, followed by thorough washing with deionized water.

Referring now to FIG. 4 with continuous reference to the foregoing figures, another covalent bonding reaction, generally designated with the numeral 400, for an adhesion promoter is shown. In this exemplary embodiment, the covalent bonding reaction 400 can bind the GO membrane 110 to the substrate 130 with the interface 120 therebetween, as shown in FIG. 1, and/or the layered GO membrane 210 to the support layer 214 with the chemical linker interface 212 therebetween, as shown in FIG. 2.

The adhesion promoter can be a trimethoxysilane adhesion promoter, namely 3-Aminopropyl trimethoxysilane (APTMS). APTMS has an identical primary amine binding group as the dopamine, but binds with free hydroxyl groups on a substrate, such as the substrate 130 shown in FIG. 1 and/or the substrate 222 shown in FIG. 2, via a silanization reaction.

APTMS forms a polysiloxane coating via silanization of the polymeric support at hydroxyl groups. In such a reaction, the primary amine binds to epoxide groups of the GO, forming a secondary amine.

APTMS coatings can be prepared by soaking substrates in a dilute concentration of the target functional group, rinsing, and then drying. In some embodiments, substrates can be prepared with 5% (m)ethoxysilane reagent in toluene (or xylenes, or hexanes) at 60° C. for 1 hour. In some embodiments, substrates can be prepared with 5% (m)ethoxysilane reagent in water at room temperature for 10 minutes. The substrates can be rinsed in ethanol. The functionalized substrates can be stored in hydrated environments prior to use.

Referring now to FIG. 5 with continuous reference to the foregoing figures, another covalent bonding reaction, generally designated with the numeral 500, for an adhesion promoter is shown. In this exemplary embodiment, the covalent bonding reaction 500 can bind the GO membrane 110 to the substrate 130 with the interface 120 therebetween, as shown in FIG. 1, and/or the layered GO membrane 210 to the support layer 214 with the chemical linker interface 212 therebetween, as shown in FIG. 2.

The adhesion promoter can be a triethoxysilane adhesion promoter, namely triethoxysilyl propylisocyanate (IPTEOS), also known as (3-isocyanatopropyl) triethoxysilane, which is an isocyanate-based adhesion promoter. The use of an isocyanate-based adhesion promoter does not produce quinoids, which can occur when secondary amide bonds in dopamine or in APTMS react with free chlorine. Instead, isocyantopropyl tethers within the isocyanate-based adhesion promoter can form urethane and amide bonds with GO in a GO membrane, such as the GO membrane 110 shown in FIG. 1 and/or the GO membrane 210 shown in FIG. 2, and triethoxysilane can bind with hydroxyl groups on a substrate, such as the substrate 130 shown in FIG. 1 and/or the substrate 222 shown in FIG. 2.

The isocyanate-based adhesion promoter binds to a substrate via a silanization reaction. The isocyanate forms urethane or amide bonds with GO in a GO membrane when it reacts with hydroxyl or carboxyl groups, respectively.

Isocyanate-based coatings can be prepared by soaking substrates in a dilute concentration of the target functional group, rinsing, and then drying. In some embodiments, substrates can be prepared with 5% (m)ethoxysilane reagent in toluene at 60° C. for 1 hour. The substrates can be rinsed in toluene to avoid hydrolysis of the isocyanate groups.

Referring now to FIG. 6 with continuous reference to the foregoing figures, an attachment scheme, generally designated by the numeral 600, for attaching a GO membrane to a substrate is shown. In this exemplary embodiment, the attachment scheme 600 can bind the GO membrane 110 to the substrate 130 with the interface 120 therebetween, as shown in FIG. 1, and/or the layered GO membrane 210 to the support layer 214 with the chemical linker interface 212 therebetween, as shown in FIG. 2.

The attachment scheme 600 can utilize an isocyanate-based adhesion promoter. The adhesion promoter forms bonds with GO by reacting with an alcohol to form a urethane linkage and/or by reacting with a carboxylic acid to form an amide linkage.

The adhesion promoter is IPTEOS. The adhesion promoter forms covalent bonds with a GO membrane, such as the GO membrane 110 shown in FIG. 1 and/or the GO membrane 210 shown in FIG. 2, and with a substrate, such as the substrate 130 shown in FIG. 1 and/or the substrate 222 shown in FIG. 2.

The attachment scheme 600 can be affected in a three-step process. First, the support surface is activated. Second, the adhesion promoter reacts with the support surface. Third, the adhesion promoter reacts with the GO. The third step can occur during GO deposition or through a subsequent bake-out of a membrane assembly.

The activation step is necessary when a substrate is made from an essentially inert material that does not react with the adhesion promoter. In some embodiments, the activation step can partially oxidize the substrate to produce a reactive surface. Oxidation can create reactive functional groups such as radicals, peroxides, and alcohols, which can react with trialkoxy silanes. Activation of the substrate surface can be achieved by using techniques such as oxidative plasma, UV/ozone, or corona discharge treatments The reaction can occur on the activated surface and can require water to be used a reagent. Trialkoxy silanes can be very reactive and can utilize ambient humidity or trace impurity of the reaction solvents as the reagent. Trialkoxy silanes can form three bonds that can react with itself as well as an activated surface.

Figure 7:
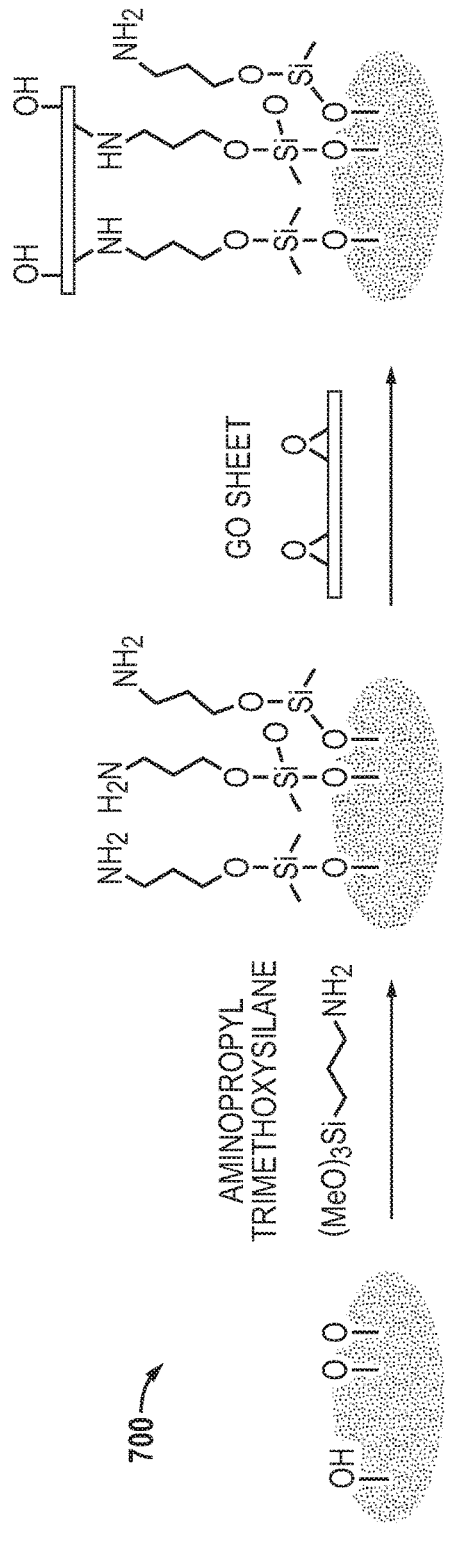
FIG. 7 illustrates a chemical reaction for an attachment scheme to bond graphene oxide to a substrate.

Referring now to FIG. 7 with continuous reference to the foregoing figures, an attachment scheme, generally designated by the numeral 700, for attaching a GO membrane to a substrate is shown. In this exemplary embodiment, the attachment scheme 700 can bind the GO membrane 110 to the substrate 130 with the interface 120 therebetween, as shown in FIG. 1, and/or the layered GO membrane 210 to the support layer 214 with the chemical linker interface 212 therebetween, as shown in FIG. 2.

Unlike the attachment scheme 600, shown in FIG. 6, the attachment scheme 700 utilizes 3-aminopropyl trimethoxysilane (APTMS) as an adhesion promoter. The adhesion promoter forms covalent bonds with a GO membrane, such as the GO membrane 110 shown in FIG. 1 and/or the GO membrane 210 shown in FIG. 2, and with a substrate, such as the substrate 130 shown in FIG. 1 and/or the substrate 222 shown in FIG. 2. The APTMS adhesion promoter can attach to the GO membranes and the substrates using the three-step process that is utilized with IPTEOS adhesion promoters.

Figure 8:
FIG. 8 illustrates the chemical structure of a flux promoter.

Referring now to FIG. 8 with continuous reference to the foregoing figures, a flux promoter, generally designated by the numeral 800, is shown. The flux promoter can bond to a substrate at one end and separates a GO layer from the substrate to allow water to flow therebetween. In this exemplary embodiment, the flux promoter has a bulky structure and/or hydrophilic region that separates the GO layer from the substrate. The bulkiness can result from the molecular weight and/or chain length of the flux promoter.

The flux promoter 800 can be added to an aqueous solution with the IPTEOS adhesion promoter that is utilized in the attachment scheme 600 shown in FIG. 6 and/or the APTMS adhesion promoter that is utilized in the attachment scheme 700 shown in FIG. 7. As shown in FIG. 8, the flux promoter 800 can be a silane-based material. In some embodiments, the silane-based material can be a hydrophilic trialkoxy silane, such as 2[methoxy(polyethyleneoxy)6-9 propyl]trimethoxysilane (PEG-TMS).

When a membrane assembly is produced without the flux promoter 800, the membrane assembly GO membranes can have lower permeate fluxes because the APTMS coating can block the pores, partially, in the substrate. Alternatively, the APTMS coating can include linkages that force the GO sheets into such close contact with the substrate that the GO sheets block the pores, at least partially.

PEG-TMS includes large polyethylene glycol chains, relative to the APTMS chains, that create space at an interface between a GO membrane and a substrate that prevents pore blockages and encourages the ingress of water due to its hydrophilic nature. In some embodiments, the number of ethylene glycol repeat units can range from six to nine repeat units. The ratio of APTMS functional units to PEG functional units can range from about 10:1 to about 1:10.

The flux promoter 800 provides an unexpected improvement in the adhesion of the graphene oxide when used with the APTMS adhesion promoter. In some embodiments, a 1:1 ratio APTMS functional units to PEG functional units provides an unexpectedly optimal level of improvement. Such an improvement is unexpected because the flux promoter 800 cannot form a covalent bond with GO in a GO membrane. For example, the membrane assembly 100 shown in FIG. 1 and/or the structure 200 shown in FIG. 2 can be assembled into flat panels or hollow fibers, rather than the spiral-wound filtration assembly 910 shown in FIG. 9

The flux promoter 800 can interact with a substrate or a layered GO membrane through non-covalent interactions such as hydrogen-bonds and dipolar attractions. Additionally, the flux promoter can include flexible PEG molecules that can fill in gaps in a substrate and create greater area for surface contact with the GO.

Figure 9:
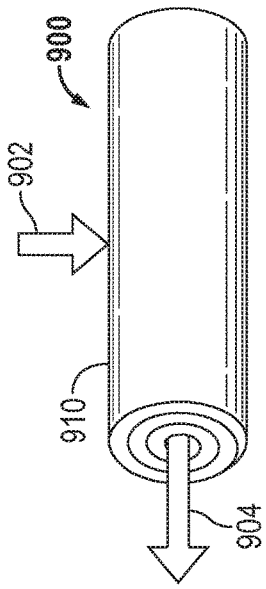
FIG. 9 schematically depicts a filtration system in accordance with an exemplary embodiment.

FIG. 9 schematically illustrates a water filtration system 900 that employs a filtration membrane assembly 910, shown as a spiral wound membrane. The membrane assembly 910 can include the membrane assembly 100 shown in FIG. 1 and/or the structure 200 shown in FIG. 2.

In operation, wastewater, brackish, or seawater enters the system 900 via an inlet stream 902, which may have first been subject to an earlier filtration to remove large particles, heavy metals, organic matter, or suspended contaminants via bag, multimedia or cartridge filtration. This can help to avoid fouling the filtration membrane assembly 910. The water in the inlet stream 902 passes through the membrane assembly 910, while solvated ions (such as Na and Cl ions and other impurities) are retained on the inlet side of the membrane assembly 910.

Fresh water leaving the membrane assembly 910 on the permeate side forms an outlet stream 904. The outlet stream 904 can then optionally be directed for further treatment depending upon the reuse application. Potential polishing steps of the permeated fresh water are similar to those used for RO-treated water and may include pH adjustment to meet potable water specifications, remineralization, and disinfection. For general purpose water production, it may be desirable to treat the product water to match the planned use, an energy and cost-saving strategy often referred to as "treat-to-need".

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps can be varied or re-sequenced according to alternative embodiments.

It is important to note that the construction and arrangement of the desalinization membranes as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed can be constructed of multiple parts or elements, the position of elements can be reversed or otherwise varied, and the nature or number of discrete elements or positions can be altered or varied. For example, the membrane assembly 100 and/or structure 200 may be assembled into flat panels or hollow fibers, rather than the spiral-wound filtration assembly. Accordingly, all such modifications are intended to be included within the scope of the present application. The order or sequence of any process or method steps can be varied or re-sequenced according to alternative embodiments. In the claims, any means-plus-function clause is intended to cover the structures described herein as performing the recited function and not only structural equivalents but also equivalent structures. Other substitutions, modifications, changes and omissions can be made in the design, operating conditions and arrangement of the exemplary embodiments without departing from the scope of the present application.

The invention claimed is:

1. A membrane assembly, comprising:
   a non-metallic, porous substrate;
   a graphene oxide membrane formed over the non-metallic, porous substrate; and
   a chemical linker interface covalently binding the graphene oxide membrane to the non-metallic, porous substrate;
   wherein the chemical linker interface includes an adhesion promoter for bonding the graphene oxide membrane to the non-metallic, porous substrate and a flux promoter for separating the non-metallic, porous substrate from the graphene oxide membrane in a spaced-apart, overlying relation; and
   wherein the flux promoter includes a plurality of silane molecules that bond to the non-metallic, porous substrate on one end and include a hydrophilic region on the opposite end.

2. The membrane assembly of claim 1, wherein the graphene oxide membrane includes two or more layers comprising graphene oxide flakes and the two or more layers have a permeation pathway of between 0.7 nm and 1.1 nm.

3. The membrane assembly of claim 2, wherein the adhesion promoter bonds the non-metallic, porous substrate to one of the layers of graphene oxide flakes that is adjacent to the chemical linker interface.

4. The membrane assembly of claim 1, wherein the non-metallic, porous substrate is formed from a non-metallic material selected from the group consisting of polyesters, polyethylene terephthalates, polyethersulfones, polysulfones, ultrafiltration membranes, multilayer composite membranes having one or more polyethersulfone layers, cellulose acetates, polycarbonates, glass fibers, polyether ether ketones, polyethylenes, polypropylenes, and olefins.

5. The membrane assembly of claim 1, wherein the non-metallic, porous substrate is a membrane.

6. The membrane assembly of claim 2, wherein the adhesion promoter is selected from the group consisting of dopamine, isocyanate, trimethoxysilane, triethoxysilane, and aminosilane.

7. A water filtration system comprising the membrane assembly of claim 1.

8. A method for assembling a membrane structure, the method comprising:
  binding a layer of material having a chemical linker to a non-metallic, porous substrate;
  depositing graphene oxide on the layer of material to form a graphene oxide membrane;
  bonding the layer of material to the non-metallic, porous substrate and the graphene oxide membrane to form an interface; and
  attaching a flux promoter to the non-metallic, porous substrate within the interface;
  wherein the flux promoter prevents the graphene oxide membrane from abutting the non-metallic, porous substrate; and
  wherein the flux promoter includes a plurality of silane molecules that bond to the non-metallic, porous substrate on one end and include a hydrophilic region on the opposite end.

9. The method of claim 8, further comprising:
  connecting the non-metallic, porous substrate to the graphene oxide membrane with an adhesion promoter within the interface.

10. The method of claim 9, wherein the graphene oxide membrane includes a plurality of layered graphene oxide flakes, the method further comprising:
  bonding the adhesion promoter to the layered graphene oxide flakes that abut the interface.

11. The method of claim 9, wherein the adhesion promoter is selected from the group consisting of dopamine, isocyanate, trimethoxysilane, triethoxysilane, and aminosilane.

12. The method of claim 8, wherein the non-metallic, porous substrate is formed from a non-metallic material selected from the group consisting of polyesters, polyethylene terephthalates, polyethersulfones, multilayer composite membranes having one or more polyethersulfone layers, cellulose acetates, polycarbonates, glass fibers, polyether ether ketones, polyethylenes, polypropylenes, and olefins.

13. An article comprising:
  a porous support;
  a graphene oxide membrane overlying the porous support; and
  a binding layer positioned therebetween,
    wherein the binding layer abuts the porous support and the graphene oxide membrane and includes a plurality of chemical linker components therein with at least one of the chemical linker components bonding the porous support to the graphene oxide membranes;
  wherein the chemical linker components includes a flux promoter for separating the porous support from the graphene oxide membrane in a spaced-apart, overlying relation; and
  wherein the flux promoter includes a plurality of silane molecules that bond to the non-metallic, porous substrate on one end and include a hydrophilic region on the opposite end.

14. The article of claim 13, wherein the graphene oxide membrane includes a plurality of graphene oxide flakes.

15. The article of claim 14, wherein the chemical linker components further comprises an adhesion promoter for bonding the porous support to the graphene oxide flakes that abut the binding layer.

* * * * *